(12) United States Patent
Yeh

(10) Patent No.: US 7,850,498 B2
(45) Date of Patent: Dec. 14, 2010

(54) SKIDPROOF SPORTS MAT

(76) Inventor: Tzong In Yeh, 4566 Crestwood St., Fremont, CA (US) 94538

( * ) Notice: Subject to any disclaimer, the term of this patent is extended or adjusted under 35 U.S.C. 154(b) by 17 days.

(21) Appl. No.: 12/370,405

(22) Filed: Feb. 12, 2009

(65) Prior Publication Data

US 2009/0148666 A1 Jun. 11, 2009

Related U.S. Application Data

(63) Continuation-in-part of application No. 12/134,704, filed on Jun. 6, 2008, now Pat. No. 7,491,105, which is a continuation of application No. 10/797,094, filed on Mar. 11, 2004, now Pat. No. 6,988,920, which is a continuation-in-part of application No. 10/386,634, filed on Mar. 13, 2003, now Pat. No. 6,955,576, which is a continuation-in-part of application No. 10/040,404, filed on Jan. 9, 2002, now abandoned, application No. 12/370,405, and a continuation-in-part of application No. 12/222,470, filed on Aug. 11, 2008, which is a continuation-in-part of application No. 11/653,208, filed on Jan. 16, 2007, now abandoned.

(51) Int. Cl.
*B63B 1/00* (2006.01)
(52) U.S. Cl. .......................... 441/65; 441/74
(58) Field of Classification Search .................. 441/65, 441/74, 68; 114/39.14, 357
See application file for complete search history.

(56) References Cited

U.S. PATENT DOCUMENTS

| | | |
|---|---|---|
| 3,016,317 A | 1/1962 | Brunner |
| 4,147,828 A | 4/1979 | Heckel et al. |
| 4,457,729 A | 7/1984 | Peerlkamp |
| 4,752,260 A | 6/1988 | Stewart |
| 4,850,913 A | 7/1989 | Szabad, Jr. |
| 5,211,593 A | 5/1993 | Schneider et al. |
| 5,224,890 A | 7/1993 | Moran |
| 5,238,434 A | 8/1993 | Moran |
| 5,503,921 A | 4/1996 | Chang et al. |
| 5,558,551 A | 9/1996 | Irby |
| 5,618,215 A | 4/1997 | Glydon |
| 5,647,784 A | 7/1997 | Moran |

(Continued)

FOREIGN PATENT DOCUMENTS

DE 2540036 A 3/1977

(Continued)

*Primary Examiner*—Lars A Olson
(74) *Attorney, Agent, or Firm*—Muncy, Geissler, Olds & Lowe, PLLC

(57) ABSTRACT

A sports mat includes a foam sheet, a patterned laminate and a skid proof layer. The foam sheet is made of polyethylene foam. The patterned laminate includes a first plastic film, a second plastic film and a pattern. The first plastic film is laminated on top of the foam sheet. The second plastic film is laminated on top of the first plastic film. The pattern is placed in between the first plastic film and the second plastic film and visible from outside of the sports mat. The skid proof layer is coated over the top surface of the second plastic film. Additionally, the skid proof layer together with the pattern laminate and the second foam layer defines a plurality of indentations and protrusions spread over a top surface of the skid proof layer so as to strengthen connection therebetween.

4 Claims, 4 Drawing Sheets

U.S. PATENT DOCUMENTS

| | | |
|---|---|---|
| 5,658,179 A | 8/1997 | Glydon et al. |
| 5,797,779 A | 8/1998 | Stewart |
| 5,928,045 A | 7/1999 | Szabad |
| 6,106,345 A | 8/2000 | Yeh |
| 6,109,991 A | 8/2000 | McClaskey |
| 6,955,576 B2 | 10/2005 | Yeh |
| 6,988,920 B2 | 1/2006 | Yeh |
| 7,063,769 B2 | 6/2006 | Cheung |
| 7,083,486 B2 * | 8/2006 | Yeh .................... 441/65 |
| 7,172,481 B2 | 2/2007 | Yeh |
| 7,246,568 B1 | 7/2007 | Cheung |
| 7,264,523 B2 | 9/2007 | Yeh |
| 7,326,094 B2 * | 2/2008 | Yeh .................... 441/65 |
| 7,404,749 B2 | 7/2008 | Cheung |
| 7,416,461 B2 | 8/2008 | Yeh |
| 7,491,105 B2 * | 2/2009 | Yeh .................... 441/65 |
| 2004/0250346 A1 | 12/2004 | Vasishth |
| 2006/0116038 A1 * | 6/2006 | Cheung .................... 441/65 |
| 2007/0020449 A1 | 1/2007 | Hing |
| 2007/0264891 A1 * | 11/2007 | Cheung .................... 441/74 |
| 2008/0248701 A1 * | 10/2008 | Yeh .................... 441/65 |

FOREIGN PATENT DOCUMENTS

| | | |
|---|---|---|
| JP | 11266995 A | 10/1999 |
| TW | M251621 | 12/2004 |

\* cited by examiner

SKIDPROOF SPORTS MAT

CROSS REFERENCE TO RELATED APPLICATION

This is a continuation-in-part application of U.S. Ser. No. 12/134,704 U.S. Pat. No. 7,491,105, filed on Jun. 6, 2008, which is a continuation of Ser. No. 10/797,094 now U.S. Pat. No. 6,988,920 filed on Mar. 11, 2004, which is a continuation-in-part of Ser. No. 10/386,634 now U.S. Pat. No. 6,955,576 filed on Mar. 13, 2003, which is a continuation-in-part of U.S. application Ser. No. 10/040,404 filed on Jan. 9, 2002, now abandoned. This is also a continuation-in-part of U.S. application Ser. No. 12/222,470, filed on Aug. 11, 2008, which is a continuation-in-part of U.S. application Ser. No. 11/653,208, filed on Jan. 16, 2007, now abandoned. Priority of all of the above-noted application is claimed under 35 U.S.C. §120, the entire contents of all of which are hereby incorporated by reference.

BACKGROUND OF INVENTION

1. Field of Invention

The present invention relates to a sports mat and in particular to a yoga mat.

2. Related Prior Art

Recently, exercise has gained popularity among people. Many people go to gyms for exercise. There is increasing need to choose a safe and comfortable sports mat. The sports mat protects a user's body from getting hurt while performing an exercise, such as Yoga, Pilates, push up or sit-up.

U.S. patent application Ser. No. 2004/0250346 discloses a skid-proof multi-layer yoga mat which includes an upper fabric layer, a lower pliable foam layer, and an intermediate adhesive such that during use the mat provides the athlete with safety and comfort and during transport or storage the rolled-up mat provides convenience.

However, the conventional sports mat is dull. This can't satisfy customers' desire for beauty. Nevertheless, the manufacturing process of the mats includes a plurality of steps, such as twisting, plunging and the like. The different colors of materials may be mixed up during the process so that a fresh colorful mat is still needed.

Hence, Taiwan Patent M251621, for example, discloses a yoga mat to enhance visual effects. The yoga mat comprises two transparent layers and a partly colored meshed laminate disposed in between the two transparent layers. The colors of the laminate are visible through the transparent layers. The visual effects are improved but to a limited extent.

What is desired, therefore, is a safe, comfortable and beautiful sports mat, which helps the athlete to enjoy exercising with a nice feeling.

SUMMARY OF INVENTION

It is an object of the present invention to provide a sports mat of controlled resilience and beautiful appearance. It is also an object of the present invention to provide a sports mat which possesses great flexibility and can be easily unrolled to be used and easily rolled up for being stored.

It is still another object of the present invention to provide a sports mat of great grip and skid resistance, and combined with good shock absorption.

It is yet another object of the present invention to provide a sports mat of great skid proof surface to prevent the user from slipping or tumbling.

With the above and other objects in view, the present invention mainly consists in a sports mat, comprising a foam sheet, a patterned laminate and a skid proof layer. The foam sheet is made of polyethylene foam and has a density in the range of 2 to 8 pcf and a thickness in the range of 2 to 8 mm. The patterned laminate includes a first plastic film, a second plastic film and a pattern. The first plastic film is laminated to a top surface of the foam sheet. The second plastic film is laminated to a top surface of the first plastic film. The pattern is printed in either the top surface of the first plastic film or a bottom surface of the second plastic film. Further, the pattern is visible through the second plastic film and the skid proof layer. The skid proof layer has a thickness less than that of the patterned laminate and is coated over the top surface of the second plastic film. Preferably, the skid proof layer is made of thermal plastic rubber. In particular, the skid proof layer together with the pattern laminate and the second foam layer defines a plurality of indentations and protrusions spread over a top surface of the skid proof layer so as to strengthen connection between the skid proof layer, the pattern laminate and the foam sheet.

Further benefits and advantages of the present invention will become clear as the description proceeds.

BRIEF DESCRIPTION OF DRAWINGS

The invention will now be elucidated by reference to the following description and accompanying drawings where.

DETAILED DESCRIPTION OF PREFERRED EMBODIMENT

With reference to FIGS. 1 to 6, description will be given of a sports mat according to the preferred embodiment of this invention.

Figure 1:
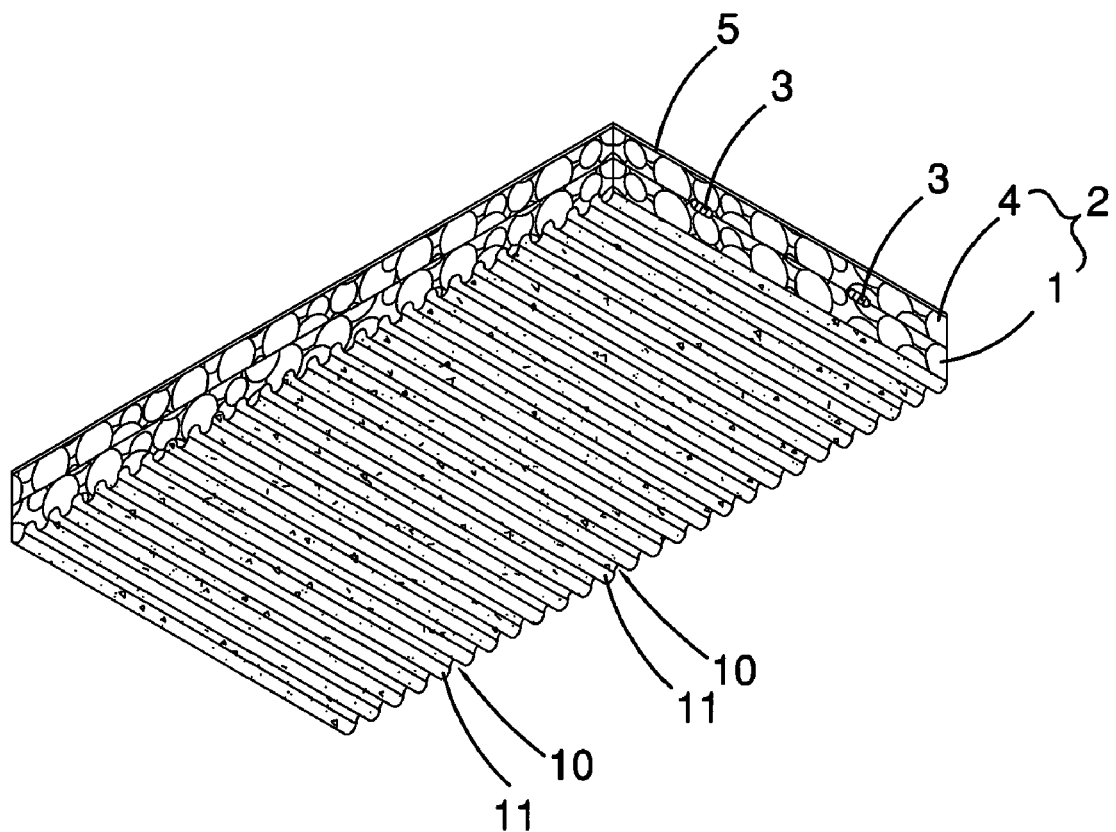
FIG. 1 is a perspective view of a sports mat according to the preferred embodiment of the present invention.
Figure 3:
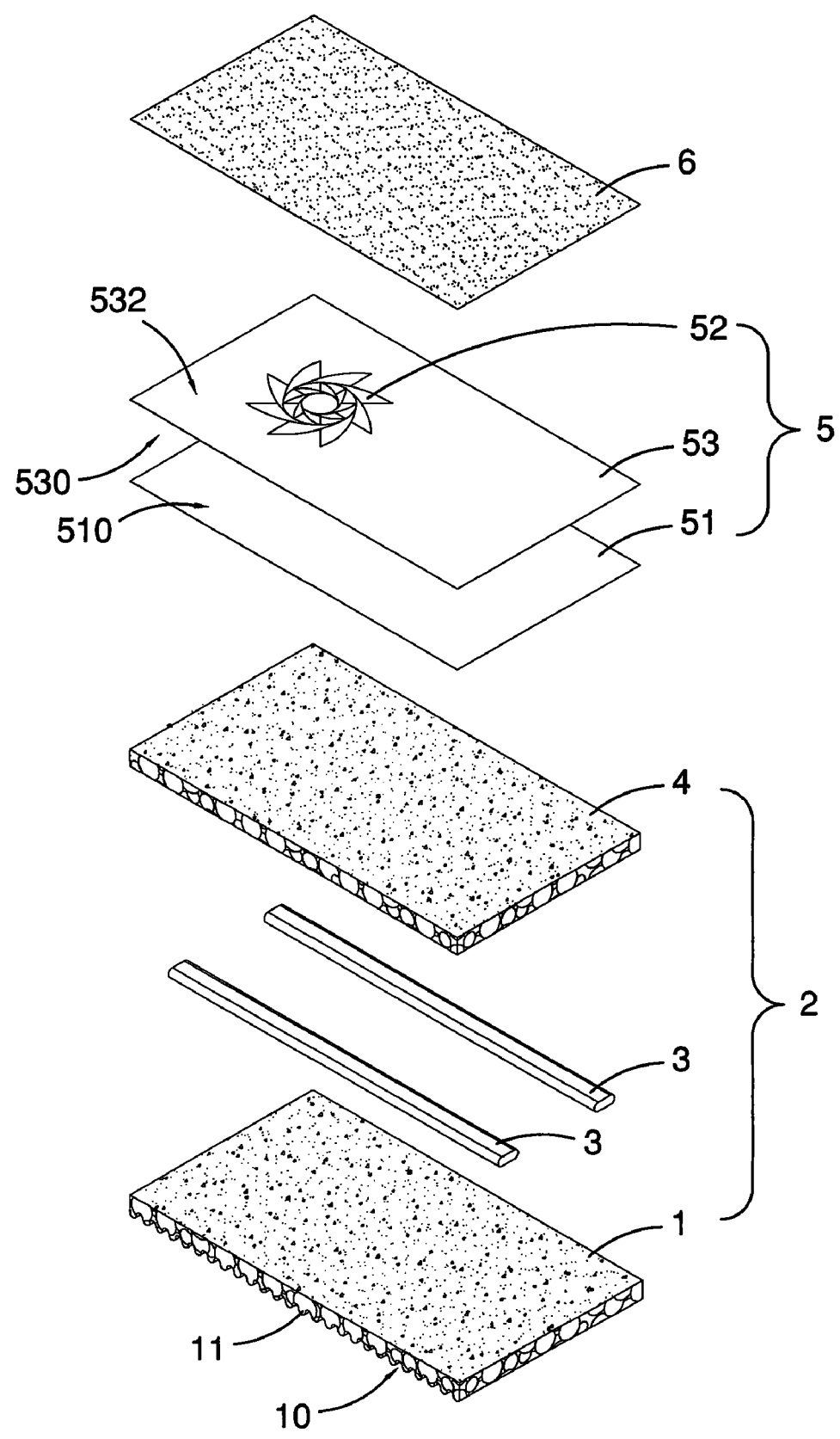
FIG. 3 is an exploded view of the sports mat of FIG. 1.

As shown in FIGS. 1 and 3, the sports mat includes a foam sheet 2, a patterned laminate 5, two pliable strips 3 and a skid proof layer 6.

Figure 2:
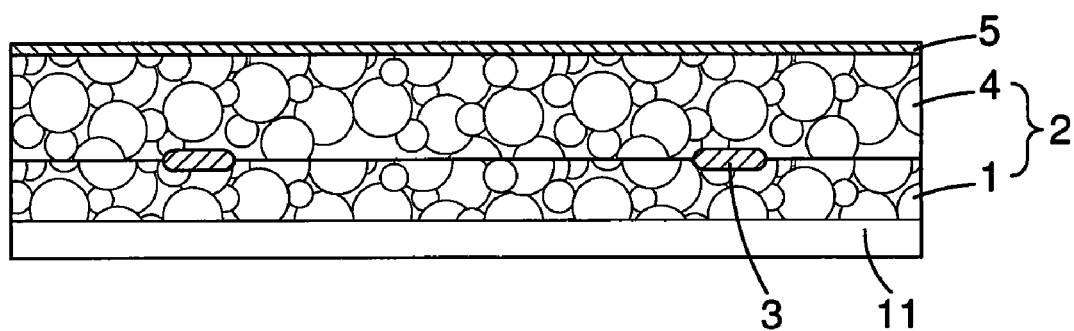
FIG. 2 is a lateral cross-sectional view of the sports mat of FIG. 1.

FIG. 2 illustrates a lateral cross section of the sports mat. The foam sheet 2 of the sports mat includes a first foam layer 1 and a second foam layer 4 laminated on a top surface of the first foam layer 1. The two pliable strips 3 are embedded in the foam sheet 2 and each extends along a longitudinal direction of the sports mat. In this embodiment, each of the pliable strips 3 is placed in between the first and second foam layers 1, 4 and parallel with each other.

The foam sheet 2 is made of polyethylene foam and has a density in the range of 2 to 8 pcf and a thickness in the range of 2 to 8 mm. Specifically, the first and second foam layers 1, 4 are both made of polyethylene foam containing an additive of elastic resin. The elastic resin helps to enhance the resilience of the sports mat. Both of the first and second foam layers 1, 4 have a density in the range of 2 to 8 pcf and a total thickness in the range of 2 to 8 mm. Preferably, the density of the foam layers is 4 pcf and the total thickness is 4 mm in order to have the sports mat possess tenderness and great flexibility. However, although the total thickness of the first and the second foam layers 1, 4 is preferably in the range of 2 to 8 mm, the thickness of the first foam layer 1 is not necessary to be the same with that of the second foam layer 4.

Since the first and second foam layers 1, 4 are generally made of the same materials so that the second foam layer 4 may be directly bonded to the first foam layer 1 via a heat lamination process without an adhesive or an intermediate layer therebetween.

The sports mat, when in use, may be placed on the floor or the like with the first foam layer 1 contacting the floor. In other appliances, the sports mat may also be applied to serve as a skin for bonding onto an exterior surface of an article, such as a surfboard, to provide appropriate protection.

Referring to FIG. 3, the patterned laminate 5 is laminated on a top surface of the second foam layer 4 and includes a first plastic film 51, a pattern 52 and a second plastic film 53. In this embodiment, the first plastic film 51 is made of polyethylene or the like so that the first plastic film 51 of the patterned laminate 5 can be directly heat-laminated to a top surface of the second foam layer 4 of the foam sheet 2 without adhesive therebetween. The second plastic film 53 is also made of polyethylene and is laminated to a top surface 510 of the first plastic film 51. The pattern 52 is printed in either the top surface 510 of the first plastic film 51 or a bottom surface 530 of the second plastic film 53. The skid proof layer 6 is coated on the top surface 532 of the second plastic film 53 of the patterned laminate 5 Additionally, the second plastic film 53 is especially transparent or translucent so that the pattern 52 is visible through the second plastic film 53 and the skid proof layer 6. Preferably, the first plastic film 51 has a thickness in the range of 0.01 to 0.07 mm, and especially 0.015 mm. The thickness of the second plastic film 53 is preferably 0.015~0.1 mm and more preferably 0.03 mm. As such, the pattern 52 can be protected from color fading as a result of protection of the first and second plastic films 51 and 53. In addition, the pattern 52 with ink is isolated from a user's skin, so that it is safe to a user.

Figure 5:
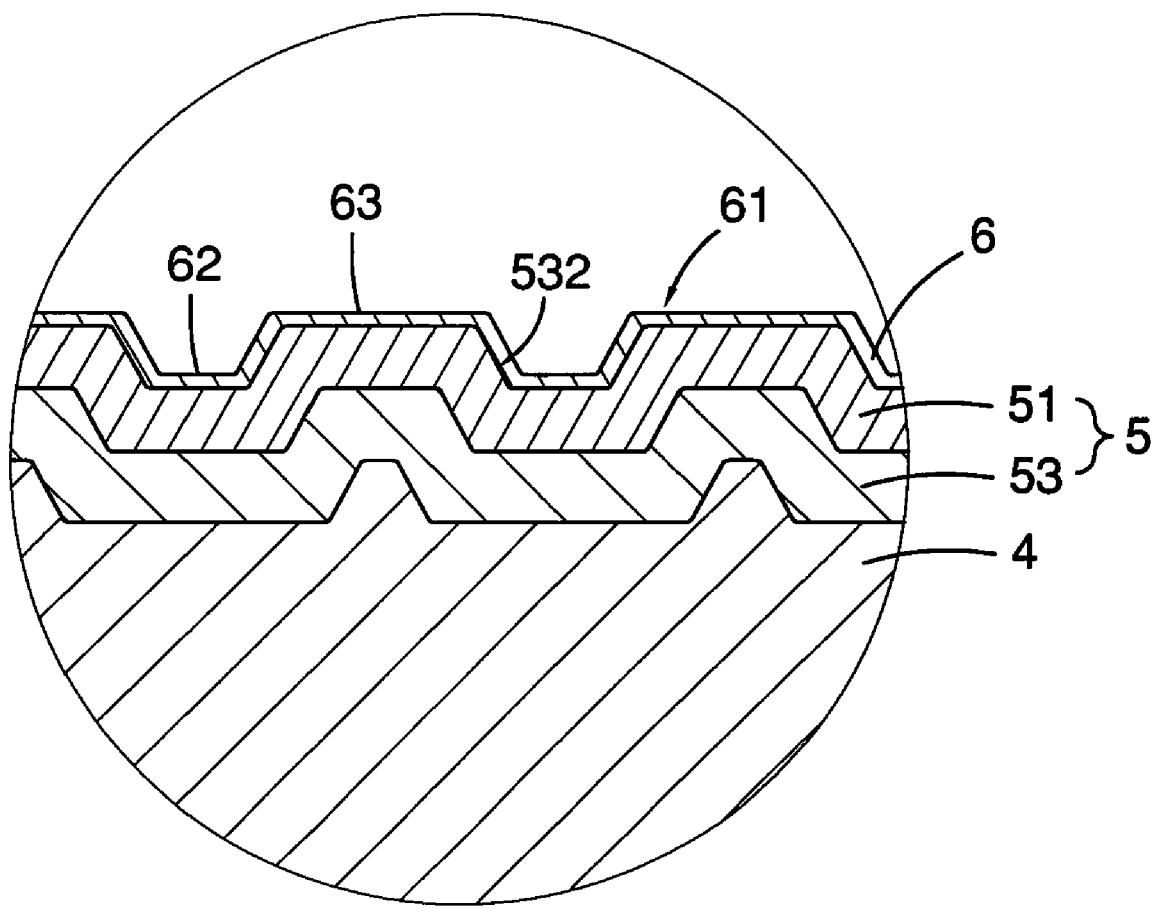
FIG. 5 is a partially enlarged view of FIG. 4.

Referring to FIG. 5, in order to strengthen connection between the skin proof layer 6, the pattern laminate 5 and the foam sheet 1, the skin proof layer 6 together with the patterned laminate 5 and the second foam layer 4 of the foam sheet 2 is embossed with irregular patterns to define a plurality of indentations 55 and protrusions 54 spread over a top surface 61 of the skin proof layer 6, as shown in FIG. 5. The indentations 62 and the protrusions 63 may be lines, dots and the like. The skid proof layer 6 has a thickness less than that of the patterned laminate. Because of the textured structure of the skid proof layer 6, the athlete or user is protected from slipping and tumbling. Preferably, the skid proof layer 6 is made of thermal plastic rubber to provide suitable resilience.

Figure 4:
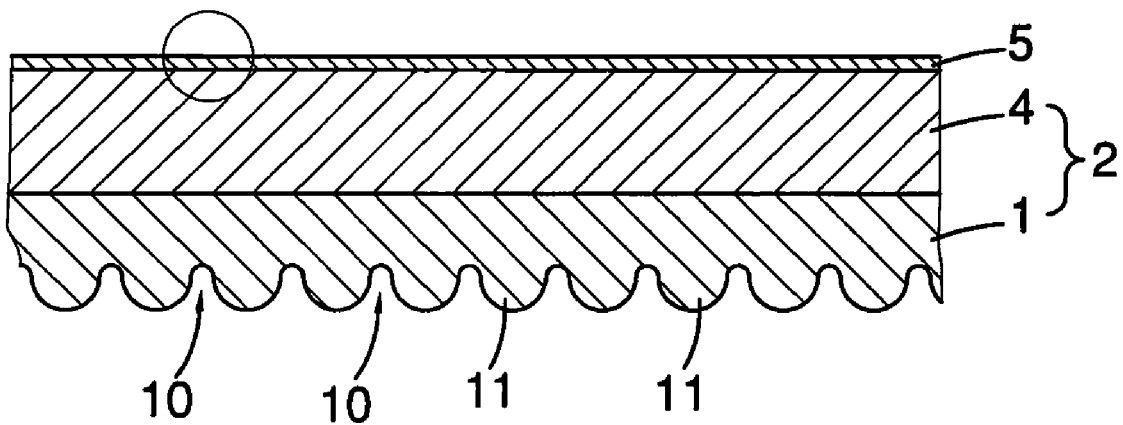
FIG. 4 is a partially, longitudinal cross-sectional view of the sports mat of FIG. 1.
Figure 6:
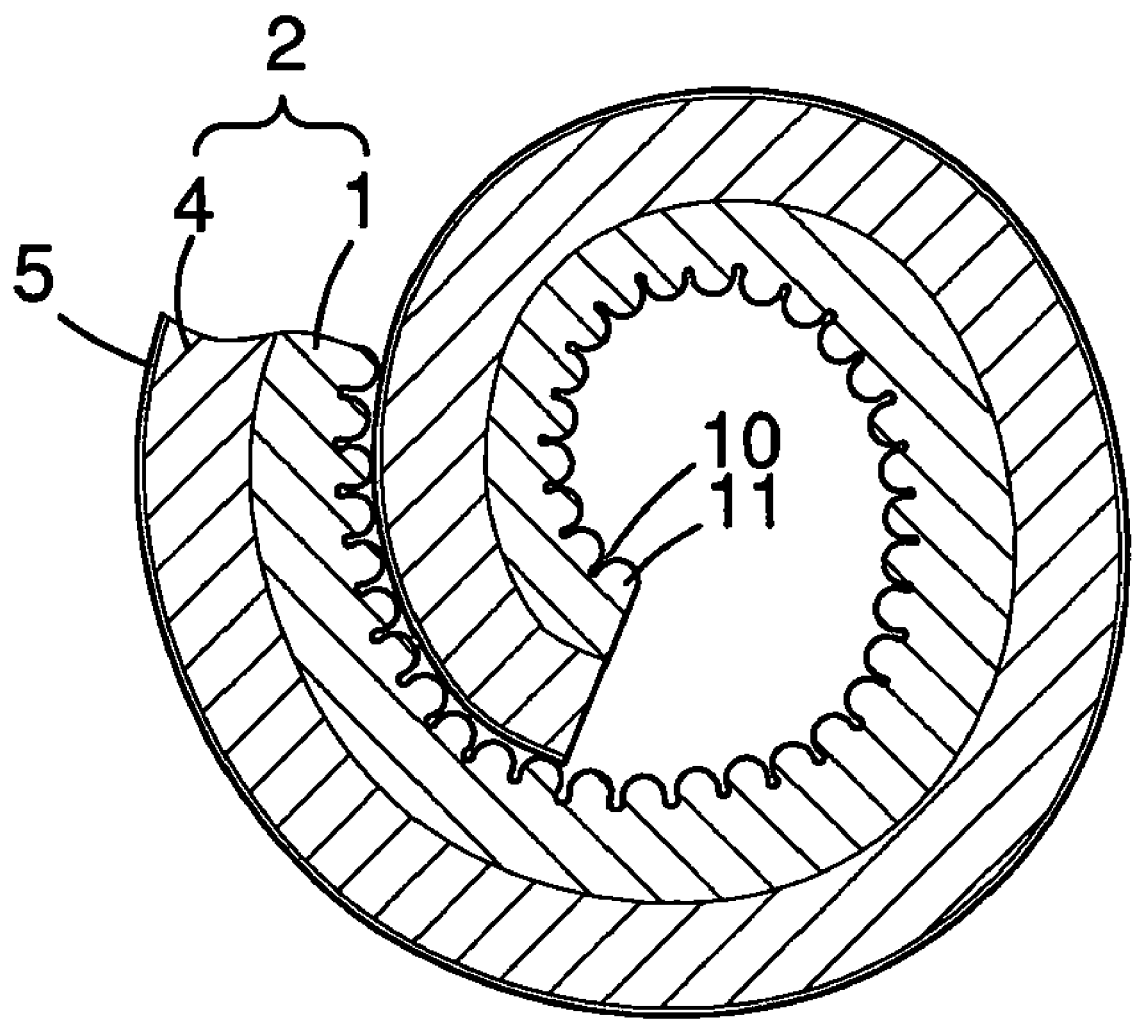
FIG. 6 is a perspective view of the sports mat, showing that the sports mat is rolled up.

As best seen in FIG. 4, the first foam layer 1 is embossed therebottom with a plurality of elongated ridges 11 separated from one another by valleys 10. Those elongated ridges 11 are parallel with an axis about which the sports mat can be rolled. In practice, the depth of the valleys 10 is preferably about 0.25 to 2 mm, and the interval between two adjacent valleys 10 is preferably 3 mm. Thus, as depicted in FIG. 6, when the sports mat is rolled up, the first foam layer 1 provides rooms, namely the valleys 10, for wresting so that the sports mat won't become shrunk. Preferably, each of the elongated ridges 11 is arch-shaped in cross section. Accordingly, the sports mat can be rolled up easily due to the elongated ridges 11 and the valleys 10. On the other hand, the embedded pliable strips 3 provide a fast unroll function for the rolled sports mat. When the rolled sports mat is untied, the sports mat can be immediately spread up because of the resilience of the pliable strips 3. Moreover, due to the profiling of the elongated ridges 11 and the valleys 10, the sports mat possesses extraordinary flexibility and provides great grip and skid resistance, and combined with good shock absorption.

Preferably, the first foam layer 1 is dark-colored with respect to the second foam layer 4. That is, the first foam layer 1 may be darker than the second foam layer 4. The second foam layer 4 is light-colored in order to serve as a background of the pattern 52 of the patterned laminate 5. As such, a variety of colorful patterns with designs or marks may be provided on the sports mat and are more vivid with respect to the light-colored background, namely the second foam layer 4.

As stated above, the sports mat of the present invention satisfies the desire of beauty as well as the needs of comfort, safety and high elasticity.

Numerous characteristics and advantages of the invention have been set forth in the foregoing description. The disclosure, however, is illustrative only, and changes may be made in detail within the principle of the invention, to the full extent indicated by the broad general meaning of the terms in which the appended claims are expressed.

The invention claimed is:

1. A sports mat comprising:
    a foam sheet made of polyethylene foam and has a density in the range of 2 to 8 pcf and a thickness in the range of 2 to 8 mm;
    a patterned laminate comprising a first plastic film laminated to a top surface of said foam sheet, a second plastic film laminated to a top surface of said first plastic film, and a pattern printed in either said top surface of said first plastic film or a bottom surface of said second plastic film; said pattern being visible from outside of said sports mat; and
    a skid proof layer having a thickness less than that of said patterned laminate, being coated over said top surface of said second plastic film and being made of thermal plastic rubber;
    wherein said skid proof layer together with said patterned laminate and said foam sheet defines a plurality of indentations and protrusions spread over a top surface of said skid proof layer so as to strengthen connection therebetween.

2. The sports mat of claim 1, wherein said foam sheet includes a first foam layer and a second foam layer laminated to a top surface of said first foam layer; said first foam layer is formed therebottom with a plurality of elongated ridges parallel to one another; and said first and second foam layers are both made of polyethylene foam containing an additive of elastic resin.

3. The sports mat of claim 2 further comprising at least one pliable strip extending along a longitudinal direction of said sports mat and being placed in between said first and second foam layers.

4. The sports mat of claim 3, wherein each of said elongated ridges of said first foam layer is arch-shaped in cross section.

* * * * *